US008301484B1

(12) United States Patent
Kumar

(10) Patent No.: US 8,301,484 B1
(45) Date of Patent: Oct. 30, 2012

(54) GENERATING ITEM RECOMMENDATIONS

(75) Inventor: Bharath Kumar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1025 days.

(21) Appl. No.: 12/044,365

(22) Filed: Mar. 7, 2008

(51) Int. Cl.
*G06Q 10/00* (2012.01)
*G06F 15/16* (2006.01)

(52) U.S. Cl. ........................................ 705/7.29; 709/227

(58) Field of Classification Search .................. 705/7.29
See application file for complete search history.

(56) References Cited

U.S. PATENT DOCUMENTS

2002/0103789 A1* 8/2002 Turnbull et al. .................. 707/3
2009/0164641 A1* 6/2009 Rogers et al. ................. 709/227

OTHER PUBLICATIONS

Citrix Systems Analyst Day, Mar. 6, 2007.*

* cited by examiner

*Primary Examiner* — Garcia Ade
(74) *Attorney, Agent, or Firm* — Thomas, Kayden, Horstemeyer & Risley LLP.

(57) ABSTRACT

Disclosed are various embodiments of systems, methods, and programs embodied in computer readable mediums for generating item purchase recommendations. To provide such a recommendation, first data is accessed using a server, the first data comprising an interaction history of an entity with respect to at least one network site. Also, second data is accessed using the server, the second data comprising a record of use of media by the entity on at least one media device remote to the server. An item recommendation is generated in the server for the entity based on the first and second data.

18 Claims, 6 Drawing Sheets

Interaction History 159

•
•
•

203

12/5/07 Enter Home Page
12/5/07 Logon to site
12/5/07 Search for “Superwidget”
12/5/07 View results page for “Superwidget”
12/5/07 View item 428375029374, “Superwidget Model 5342”
12/5/07 View item 290850984590, “Specialwidget”
12/5/07 View item 023092823904, “Widgetease”
12/5/07 Add item 023092823904, “Widgetease” to Cart
12/5/07 View shopping cart
12/5/07 View Purchase Page
12/5/07 View Shipping Address Change Page
12/5/07 Store new shipping address
12/5/07 View Payment Method Page
12/5/07 Store New Payment Method
12/5/07 Submit for Payment
12/5/07 View receipt page
12/5/07 Download to Device
12/5/07 Logoff
1/6/08 Home page
1/6/08 Seach for “Blue Widget”
1/6/08 View results page for “Blue Widget”
1/6/08 Logoff

•
•
•

FIG. 2

Record of Media Use 163

•
•
•

4/1/07 2:30pm Start Audio 2398749857 (AP) 176
4/1/07 2:34pm End Audio 2398749857 (AP)
4/1/07 2:34pm Start Audio 2348902348 (AP)
4/1/07 2:39pm End Audio 2348902348 (AP)
4/1/07 2:39pm Start Audio 2348345348 (AP)
4/1/07 2:44pm End Audio 2348345348 (AP)
4/1/07 Receive Video Movie 23452353 (STB)
4/1/07 5:00pm Start Viewing Movie 23452353
4/1/07 5:32pm End Viewing Movie 23452353 (STB) (Stop at 0:32:00)
4/1/07 6:07pm Start Viewing Video Content Item 34242 (STB)
4/1/07 6:13pm Change Viewing Channel from 05 to 08
4/1/07 6:13pm End Viewing Video Content Item 34242 (STB)
4/1/07 6:13pm Start Viewing Video Content Item 25435 (STB)
4/1/07 6:30pm Change Viewing Channel from 08 to 16 (STB)
4/1/07 6:30pm End Viewing Video Content Item 25435 (STB)
4/1/07 6:39pm Turn Off STB
4/1/07 8:02pm Turn on STB
4/1/07 8:02pm Start Viewing Movie 23452353 (STB) (Start at 0:25:54)
4/1/07 9:05pm End Viewing Movie 23452353 (STB) (End at 1:34:00)
4/1/07 9:10pm Receive Rating for Movie 23452353 (STB)
4/1/07 7:10pm Start Viewing Movie 745345 (STB) (Start at 0:00:00)
4/1/07 8:03pm Rewind Movie 745345 from 0:55:42 to 0:43:42 (STB)
4/1/07 8:07pm Forward Movie 745345 from 0:47:45 to 0:52:54 (STB)
4/1/07 9:05pm End Viewing Movie 745345 (STB) (End at 1:45:54)

•
•
•

FIG. 3

GENERATING ITEM RECOMMENDATIONS

BACKGROUND

For merchants, such as online merchants, it can be helpful to provide purchasing recommendations for customers to aid in their purchases. Such recommendations might result in additional purchases, rentals, or other consumption that the customers otherwise would not have made. However, sometimes it can be difficult to generate accurate and relevant recommendations for customers that actually result in additional sales.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of one example of an interaction history file generated from an interaction of an entity with a network site served up by a server in the electronic commerce network of FIG. 1 according to various embodiments of the present disclosure;

FIG. 3 is a drawing of one example of a record of use of media on a media device in the electronic commerce network of FIG. 1 according to various embodiments of the present disclosure;

DETAILED DESCRIPTION

Figure 1:
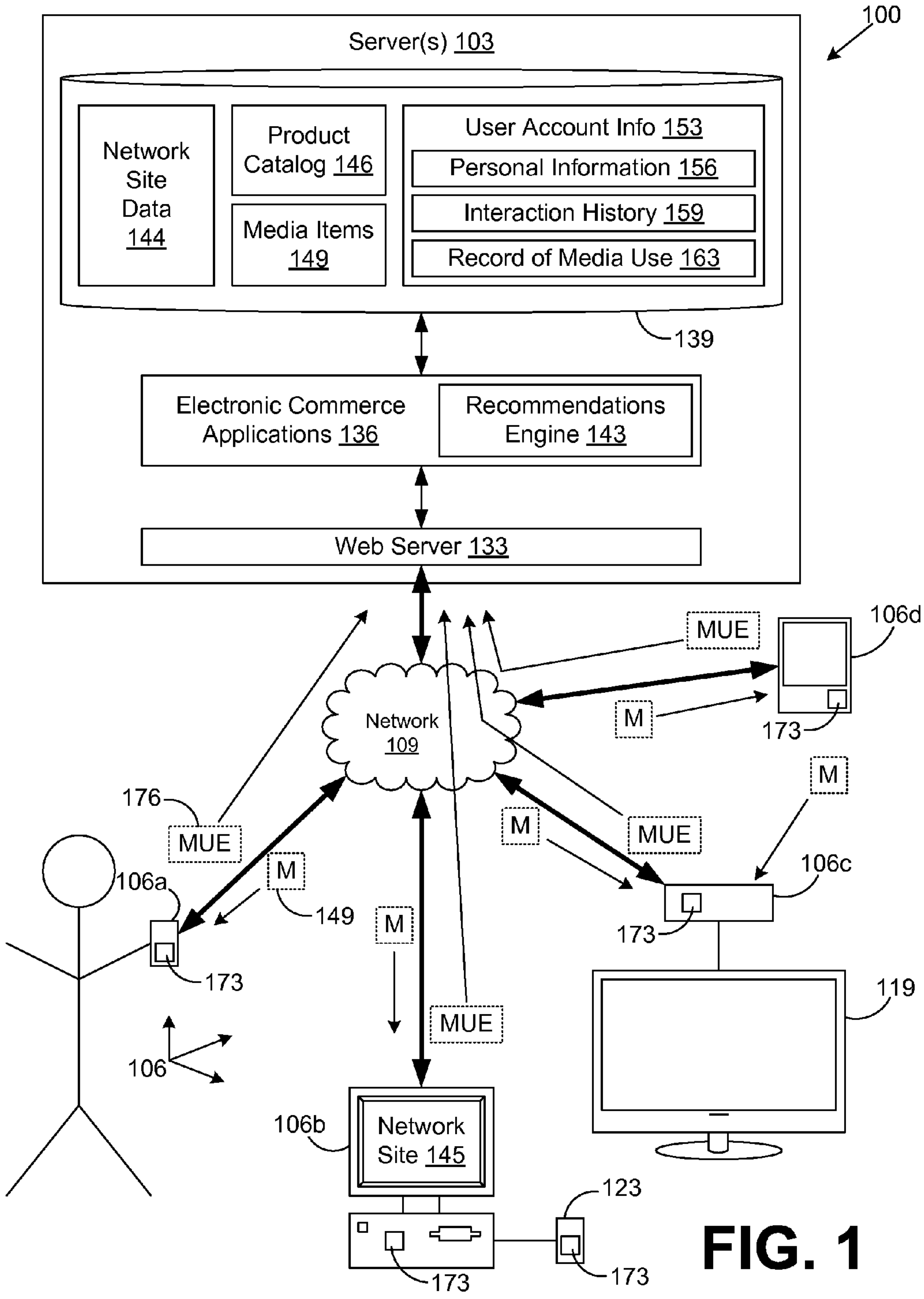
FIG. 1 is a drawing of an electronic commerce network according to various embodiments of the present disclosure.

With reference to FIG. 1, shown is an electronic commerce network 100 according to various embodiments of the present disclosure. The electronic commerce network 100 includes one or more servers 103 and various media devices 106 and/or clients, each of which is coupled to a network 109. The media devices 106 are devices that can be employed to make media items humanly perceptible. The media devices 106 coupled to the network 109 comprise, for example, an audio/video player 106*a*, a computer system 106*b*, a set top box 106*c*, an electronic book (ebook) reader 106*d*, or other device. Accordingly, a media item may be made humanly perceptible by displaying the media, generating sound represented by the media (i.e. from music files), or making a media item humanly perceptible in some other manner.

The media devices 106 may also include other functionality in addition to the ability to play, render, or otherwise make media items humanly perceptible. For example, each of the audio/video player 106*a*, computer system 106*b*, set top box 106*c*, and ebook reader 106*d*, or other device may include browser capability or other like capabilities so as to be able to act as a client on the network 109 with respect to the server 103 as can be appreciated. Also, the audio/video player 106*a* may be included within a device such as a personal digital assistant, cellular telephone, or other wireless device as can be appreciated. The network 109 may comprise, for example, the Internet, intranets, wide area networks (WANs), local area networks, wireless networks, or other suitable networks, etc., or any combination of two or more such networks.

The computer system 106*b* may comprise, for example, a desktop computer, laptop, or other device with like capability as can be appreciated. The set top box 106*c* may comprise, for example, a cable ready or satellite ready set top box and/or personal video recorder (PVR) that couples to a television 119 as can be appreciated. While the computer system 106*b* may communicate with the servers 103 as will be described, it is possible that an audio/video player 123 may be coupled to the computer system 106*b* to facilitate communication between the audio/video player 123 and the server 103.

Further, it is understood that the audio/video player 106*a*, the computer system 106*b*, the set top box 106*c*, and the ebook reader 106*d* are all examples of various different media devices 106 that may be employed as described herein. As such, there may be other types of media devices 106 beyond those described herein that fall within the scope of the present disclosure. Also, it should be understood that the various media devices 106 described herein as comprising separate components may actually be physically integrated into other devices. For example, the set top box 106*c* may be integrated as part of the television 119.

The server 103 includes various components such as, for example, a web server 133, one or more electronic commerce applications 136, and a data store 139. The web server 133 comprises a server technology that responds to requests from the media devices 106 when acting as clients with respect to the server 103. Alternatively, other types of server technologies may be employed beyond a web server 133, where the web server 133 is specifically designed to accept HTTP requests from clients that execute applications such as web browsers and to serve up appropriate HTTP responses as can be appreciated. For example, in some embodiments, the media devices 106*a-d* may act as clients that interface with a service, such as a web service associated with the components of server 103. However, it is understood that any general or specific purpose client/server environment may be used and the web server 133 is described herein as one possible embodiment, among many others.

The electronic commerce applications 136 facilitate the functions of an online merchant, for example, in that they facilitate the online purchase of items whether such items comprise goods, services, the rental of goods or services, or consumption of other items that are ultimately provided to customers. In one embodiment, the electronic commerce applications 136 facilitate the purchase and download of media items such as digital content. Such media items may comprise, for example, audio files such as songs in MP3 format or other digital formats that are downloaded to audio/video players 106*a*. Also, the media items may comprise video content items such as movies or other video content that may be downloaded to the audio/video player 106*a*, the computer system 106*b*, or the set top box 106*c* as can be appreciated. Further, the media items may comprise digital text that may be rendered on the computer system 106*b* or the ebook reader 106*d*. Also, the media items may include other items not specifically described herein.

The electronic commerce applications 136 include a recommendations engine 143 that is executed in order to generate recommendations for customers for the purchase of other items based upon their interaction history and record of media use on media devices 106. The data store 139 in the server 103 includes various data items as needed to facilitate the electronic commerce implemented by the electronic commerce applications 136. To this end, the data store 139 may include, for example, network site data 144 that provides data needed by the electronic commerce applications 136 to generate a page or other portion of a network site 145 served up by the web server 133 and the electronic commerce applications 136 to a client such as the computer system 106*b* or other client. To this end, the electronic commerce applications 136 may dynamically generate pages or other portions of the network site as can be appreciated. The various pages or portions of the network site 145 may be rendered, for example, on a display device associated with a given client 106*b* or any other device with like capability.

The data store 139 may also include a product catalog 146 that describes the various products that may be sold by the electronic commerce applications. In addition, some of the products sold by the electronic commerce applications 136 may include media items 149 that comprise digital content items that are stored in the data store 139. The media items 149 may comprise, for example, text content, audio content, video content, and/or audio/video content, whether they be songs, movies, videos, audio books, e-books, or other media items as can be appreciated.

The data store 139 further includes user account information 153. The user account information 153 may include personal information 156 about individual customers that facilitates the purchase of goods by the customers. For example, the personal information 156 may include billing addresses, shipping addresses, credit information, payment methods such as credit cards or other payment provisions, and other information.

In addition, the user account information 153 includes an interaction history 159 and a record of media use 163 for specific customers. The interaction history 159 comprises data that details the interaction of a given entity or user with respect to the electronic commerce applications 136. To this end, the electronic commerce applications 136 and the web server 133 serve up various pages or other components of a network site 145 such as, for example, the pages of a website on the World Wide Web that facilitate the operation of the online merchant. The interaction history 159 comprises a record of the interaction of a given entity or user in manipulating a client to access the various pages or other components of the network site 145. For example, the interaction history 159 may memorialize actions taken by a given client such as placing items in a virtual shopping cart, removing items from a shopping cart, consummating purchases of items, viewing various items in the electronic catalog, how items are tagged by the user, the values of ratings given for various items in the electronic catalog, which products or types of products the user has reviewed, a user's gifting actions, terms employed for searching items to purchase, a user's click path among the pages of the electronic catalog, among many other actions.

The record of media use 163 includes information describing how entities that comprise one or more individuals actually use or consume media items 149 on the respective media devices 106. The media items 149 that are actually used on media devices 106 may be purchased by entities through the web server 133 in the electronic commerce applications 136, or may be obtained from some other source such as broadcast signals or other media received at a set top box 106*c*, at physical stores (e.g. compact discs, digital versatile discs), other retailers, etc.

To this end, as depicted in FIG. 1, various media items 149 may be purchased or otherwise obtained and provided to the media devices 106 such as the audio/video player 106*a*, computer system 106*b*, set top box 106*c*, ebook reader 106*d*, or other device. In some embodiments, the computer system 106*b* may hand off a received media item 149 to a media device, such as an audio/video player 123 coupled thereto. In some embodiments, the computer system 106*b* may itself be employed as a media device to achieve playback of the media items 149 as can be appreciated.

Although it is shown that the media items 149 are obtained, for example by purchasing such media items 149 through the web server 133 and electronic commerce applications 136, it is understood that each of the media devices 106 may include an application such as a browser or other application that facilitates the download of media items 149 from other sources coupled to the network 109 as can be appreciated. For example, the media can be received from satellite transmissions, from a cable television head end system, among other possibilities. Furthermore, the media need not be electronically transmitted, but may also be physically provided via CD, DVD, memory device, hard drive, or other transportable memory device.

Each of the media devices 106, including the audio/video player 106*a*, computer system 106*b*, set top box 106*c*, ebook reader 106*d*, audio/video player 123, or other device, include a tracking agent 173. The tracking agents 173 are configured to track the usage or playback of media items 149 on the media device 106. When tracking the use of various media items 149, the tracking agents 173 may generate media usage events 176 to the server 103. The media usage events 176 are stored in the record of media use 163 in the user account information 153 of the data store 139 for a respective user or entity. The media usage events 176 provide a record of media use on a given media device 106. Given that an entity such as an individual, family, or other group of individuals may own or control several different media devices 106, it may be the case that several records of media use 163 are associated with a given account of such an entity.

Next, a general discussion of the operation of the various components of the electronic commerce network 100 is provided according to the various embodiments. Assume that a given entity that owns or controls a given media device 106, such as an audio/video player 106*a*, a computer system 106*b*, a set top box 106*c*, ebook reader 106*d* or other device, may manipulate such device in order to purchase or otherwise consume or access products through the web server 133 and the electronic commerce applications 136 that are operated by a given online merchant. For example, one may manipulate a given client to access a network page served up by the web server 133 to facilitate the consumption of items from the online merchant.

The items may be, for example, any sort of goods such as consumer items whether they be embodied in a physical form, or digital content items such as the media items 149 that are downloaded to media devices 106. The items may also comprise a rental of goods or services. When a user accesses the network site 145 served up by the web server 133, the recommendations engine 143 is executed in the server 103 in order to generate a recommendation for the purchase of products by the entity based upon the interaction history 159 and the record of media use 163 for such entity.

To this end, the recommendations engine 143 may access the data that embodies the interaction history 159 with respect to the network site 145 served up by the web server 133 in the electronic commerce applications 136. Also, the recommendations engine 143 may access the data embodying the record of media use 163 by the entity on a given media device 106. By accessing such information, the recommendations engine 143 can generate recommendations for a user that are relevant to the typical behavior of the user in using various media items 149 on their respective media devices 106 such as the audio/video player 106*a*, computer system 106*b*, set top box 106*c*, an ebook reader 106*d*, or other device.

In generating the recommendation of items, the recommendations engine 143 may assign a weight to the data representative of the interaction history 159 and the data that is representative of the record of media use 163 by a given entity. Such weights may indicate a relative importance of such data in generating the recommendations. For example, it may be that a record of media use 163 is more indicative of the interests of a given entity than their interaction history 159 with respect to the network site 145 that facilitates the purchases of items. Alternatively, the opposite may be the case. In additional alternatives, it may be that various portions of the interaction history 159 and various portions of the record of media use 163 are weighted according to predefined criteria in order to generate a recommendation. For example, it may be that data items in the interaction history 159 and/or the record of media use 163 should be given greater weight depending upon how recent such interaction or use occurred under the principle that the most recent information is the most relevant.

As described above, the media items 149 playing within any one of the media devices 106 may be purchased through the network site 145 that is served up by the web server 133 in the electronic commerce applications 136. As such, a given entity may create an account with the merchant that operates the server 103 providing the user account information 153 as described above. For example, a given entity may manipulate a client device that includes a browser to interface with various network pages served up by the server 103 in order to provide personal information 156 so as to establish an account to facilitate future purchases by the person or entity.

As contemplated herein, an "entity" may comprise an individual or group of two or more individuals that operate under a given user account stored within the data store 139. For example, where an entity is a given family unit, there may be a person who is the head of the household that actually holds the account with the merchant operating the server 103. This individual may make purchases on behalf of the entire entity (family unit). The one or more media devices 106 such as the audio/video player 106*a*, the computer system 106*b*, the set top box 106*c*, ebook reader 106*d*, or other device may be associated with a given individual or with the individuals making up the entity as described above. For example, the set top box 106*c* may be used by all individuals within a given entity such as a family or other group. Alternatively, an audio/video player 106*a* or ebook reader 106*d* may be used by an individual within a given entity, or may be used by all individuals associated with an entity.

With this in mind, we next discuss the operation of the tracking agents 173 on the media devices 106. The tracking agents 173 are executed on the media devices 106 in order to track the use of media by a given entity. As such, the tracking agents 173 are configured to send media usage events 176 to the server 103 to accumulate the record of media use 163 with respect to the given entity as identified in the user account information 153. To this end, a given tracking agent 173 executed in a media device 106 may provide information in each of the media usage events 176 transmitted to the server 103 that identifies the media device 106 itself and the entity associated with the media device 106. The media usage events 176 may communicate any one of a number of different events that occur on a given media device 106.

For example, the tracking agents 173 may be configured to detect a change in the state of a media device 106. A change in the state of a media device 106 may be, for example, the start of the playing of a new media item 149, a stopping of the playing of a media item 149, or a change in the media item 149 that is played on the media device 106 as may occur with the changing of channels on a set top box, etc. In another example, the change in the state of the media device 106 may involve a change in the state of a control component associated with a media device 106 such as, for example, a volume control knob or other control component. Further, the state of a media device 106 may involve changing from normal playback to rewinding, fast forwarding, skipping a portion of content, rewinding, recording, etc.

There may be any number of other different changes in the state of the operation of media devices 106 that may be reported to the server 103 in a media usage event 176 as can be appreciated. The media usage events 176 are generated and sent to the server 103 upon detection of the change in the state of the media device 106.

In addition to the state change, the event report can include a location of a portion of the media associated with the event change. For example, the portion of media that a user fast forwards through can be reported to the server. The location can be reported, for example, as a time range of the relevant portion of media, among many other possibilities. The portions of media may also have information or other metadata associated with them that describe the portion of media at the reported location. For example, the portions of media may be labeled or tagged according to a characteristic of the content (e.g. "scary", "commercial", "comedy", and/or "children"). This metadata may be embedded with the media or in a separate location, local to or remote from the media itself. Accordingly, the activity meshed with this information can be used as additional information in determining what users like or dislike. For example, if users fast forward through "scary" content, it could be inferred that the user does not like scary content. Additionally, if the user changes the channel at a time when "childrens" content is playing, it can indicate that the user does not like to view children's content.

Still further, an entity may manipulate various input components of a given media device 106 in order to rate a media item 149 based upon any one of a number of rating scales, such as 1-5 stars or other media rating scale. Such information may be provided in the form of a media usage event 176 and included in the record of media use 163 for a given entity. Such rating provides direct information as to the likes and dislikes of the entity relative to various media items 149.

In any event, the media usage events 176 ultimately communicated to the servers 103 and accumulated in a respective record of media use 163 for a given user account associated with a given entity may be processed in order to identify the nature of the use of various media items 149 on the part of a given entity. Such information may then be used by the recommendations engine 143 to provide purchase recommendations that are potentially more relevant to the entity shopping for goods on a network site 145 served up by the server 103 as described above.

As mentioned above, a given entity associated with an account maintained in the server 103 may involve a group of individuals. Each one of these individuals may have their own individual interests and may ultimately use different media items 149 commensurate with their individual interests. For example, in a case where the media device is a set top box 106*c* as described above, and a given entity is a family unit for which a parent shops online through the network site 145 served up by the server 103, then there may be several different categories of use of various media items 149 by the different individuals associated with such an entity.

For example, children within the family would be inclined to watch children's shows on television 119 at certain times in the day such as, for example, on Saturday mornings or after they come home from school. Adults within the family may watch different media items 149 such as, for example, sporting events or various shows that are televised late in the day, etc. Thus, the record of media use 163 for a given media device 106 may reflect the fact that there are different categories of use of media associated with a given entity.

According to one embodiment, the recommendations engine 143 is configured to draw an association between a category of use of media associated with a given entity and the current interaction of such entity with the network site 145 served up by the web server 133 in the electronic commerce applications 136 to a client of the entity. In one example, a user may identify who they are to the electronic commerce applications 136, for example, such as happens when a user logs into the electronic commerce applications 136. In order to identify a category of use of the media stored in the record of media use 163, the recommendations engine 143 may be configured to identify circumstances surrounding the use of media items 149 involved. For example, a circumstance to be taken into account may be the time of day of the use of the media. To this end, the recommendations engine 143 may, for example, take into account various demographic information available that indicates when and by whom various media items 149 are watched, listened to, or read during the course of a given day or other time period.

The recommendations engine can also use information about the media being consumed to tie it with a user account associated with the electronic commerce applications 136. That is, by using both the interaction history 159 and the record of media use 163, the recommendations engine may be able to infer which user is performing the actions with the media device. For example, in a family where there is a user who has purchased, browsed, and/or searched on sports related items, the recommendations algorithm could infer that this user is also the same user that is watching a sports related media program or reading a sports related e-book. Likewise, if the interaction history 159 indicates certain dislikes, these can similarly be used to also make inferences about the identity of the user that is using the media device 106.

Further, another circumstance to take into account is the location of the use of the media. Specifically, if the media is used with a set top box 106*c* on a television 119, then assumptions may be made about such use as opposed to the use of media on an audio/video player 106*a* that is portable and may be used at any location. Further circumstances to be taken into account may involve the state of control components associated with media devices 106. For example, if the media device 106 is playing at a very loud volume, it may be assumed that younger listeners are involved as opposed to older listeners who might not want such high volume. In addition, there may be other control components associated with the media device 106 that may be manipulated.

In another example, if the media device 106 is equipped with a location sensing mechanisms (such as a global positioning device, triangulation device, etc.) the location of the user can be used to infer the identity of the user. For example, if the user is consuming media at a baseball stadium, it may be inferred that this user is the same user in the family that also views and purchases baseball related merchandise from product catalog 146.

To cite yet another example, assume that a parent of a family described above manipulates the computer system 106*b* in order to access the merchant's network site 145 served up through the web server 133 in the electronic commerce applications 136. Further, assume that the parent wishes to purchase school supplies for their children at the beginning of the school year.

In one embodiment, the recommendations engine 143 recognizes that this entity is purchasing school supplies for children and may look to the record of media use 163 for such entity to identify the use of media items 149 falling in a category of use typically associated with children. Perhaps a favorite television show will have been watched over and over again at certain times of the day by children of the family unit that makes up the entity.

Accordingly, the recommendations engine 143 draws the association between the current interaction with the network site 145 (i.e. viewing school supplies for purchase) and the respective category of use of media as can be determined from a corresponding record of media use 163. The recommendations engine 143 may then generate recommendations for the purchase of different school supply items such as lunch boxes or book bags that are emblazoned with images taken from the television shows that are presumably watched by the children associated with the entity.

Similarly, the parent who is part of the entity may wish to purchase movies or other media items 149 for the family. It may be the case that the set top box 106*c* is employed to play such movies purchased in the past. The recommendations engine 143 may draw an association to the types of movies viewed on the network site 145 for purchase and a corresponding category of use of items in the respective record of media use 163. Ultimately, an association is drawn between the interaction with the network site 145 and the relevant media use indicated in the record of media use 163. Also, relevant information in the interaction history 159 may be consulted along with the respective information in the record of media use 163. In this manner, the recommendations engine 143 may generate recommendations for different movies that are most relevant to the current interaction with the network site 145 as indicated by the types of movies watched by the entity.

As an additional alternative, a purchase recommendation may not draw an association between the current interaction with the network site 145 and information in the record of media use 163 or the interaction history 159 in order to generate a purchase recommendation. In this respect, the recommendation may be generated based upon the information in the record of media use 163 and/or the interaction history 159 alone without regard for the current interaction. However, taking the current interaction into account provides for more directed recommendations aimed at the current search for products by the entity.

The recommendations engine 143 may also examine the past interaction history 159 in conjunction with the record of media use 163 of an entity in order to generate a purchase recommendation. For example, it may be that the interaction history 159 indicates a past purchase of a particular media item 149 by the entity. However, the record of media use 163 may indicate that such media item 149 purchased was only viewed partially and then was never viewed again. This might indicate, for example, that the entity viewing the media item 149 may have determined after a short while that the media item 149 wasn't worth watching anymore.

Thus, while the interaction history 159 may indicate an interest in the type of media item 149 by virtue of the fact that it was purchased, the record of media use 163 may indicate that the entity actually does not have any interest in such media items 149. As such, the record of media use 163 for a given entity may be employed to verify the ultimate interest indicated in the interaction history 159.

For example, it may also be the case that the entity may repeatedly watch the media item 149 over and over again after its purchase. This would indicate a much greater interest in the media item 149 and, consequently, the purchase of the media item 149 provides a much greater indication of interest on the part of the entity. Thus, for example, when making recommendations, products may be recommended that are specifically associated with the often viewed media item 149. Such products may comprise, for example, promotional items or items that are associated with the given media item 149 in some other manner.

Ultimately, when the recommendations are highly relevant to the interests of the entity making purchases, the probability of making sales increases. Accordingly, the profitability of the online merchant increases.

Referring next to FIG. 2, shown is an example of a portion of a file that embodies an interaction history 159 according to various embodiments. As depicted, the interaction history 159 involves the interaction of a given entity with a network site 145 served up by the web server 133 and the electronic commerce applications 136. For example, various network pages may be generated dynamically by the electronic commerce applications 136 and served up by the web server 133 in response to various HTTP requests generated by a respective client device.

A user may manipulate a client such as a computer system 106*b*, personal digital assistant, or other device to interact with a network site 145 to purchase goods or perform other actions, thereby establishing the interaction history 159 with respect to the entity. To this end, the interaction history 159 lists various interaction events 203 including logging onto the network site, searching for various items, viewing the results of a search, adding items to a shopping cart, removing items from a shopping cart, implementing the purchase of an item placed in a shopping cart, downloading a purchased item to a media device, and other interaction events 203. The interaction events 203 may be viewed as logs generated upon the performance of various actions of a given entity with respect to a network site 145 served up by the web server 133 in the electronic commerce applications 136.

Referring next to FIG. 3, shown is one example of a record of media use 163 according to various embodiments. As shown, the record of media use 163 includes media usage events 176 generated by respective ones of the media devices 106 described above. In particular, each of the media usage events 176 memorializes a change in a state of a given media device 106 pertaining to the operation of such device. For example, each media usage event 176 may indicate a given day and time of generation, and an indication as to the nature of the change in state of the respective media device 106. Such an indication may be, for example, "start audio," "end audio," "receive video movie," "fast forward a movie," "rewind movie," "start viewing movie," "end viewing movie," "start viewing video content item," "end viewing video content item," and many other types of media usage events 176.

The media usage events 176 resemble logs generated each time a respective media device 106 is manipulated to change its operational state as described above. As shown in FIG. 3, two different media devices 106 are indicated where "AP" stands for "audio player" and "STB" stands for "set top box." The information included in a given one of the media usage events 176 is that necessary to establish the date and time of event, the type of event, the media item to which the event pertains, the specific media device 106 upon which the event occurred, and any other information deemed necessary in order to provide a complete record of media use 163.

Figure 4:
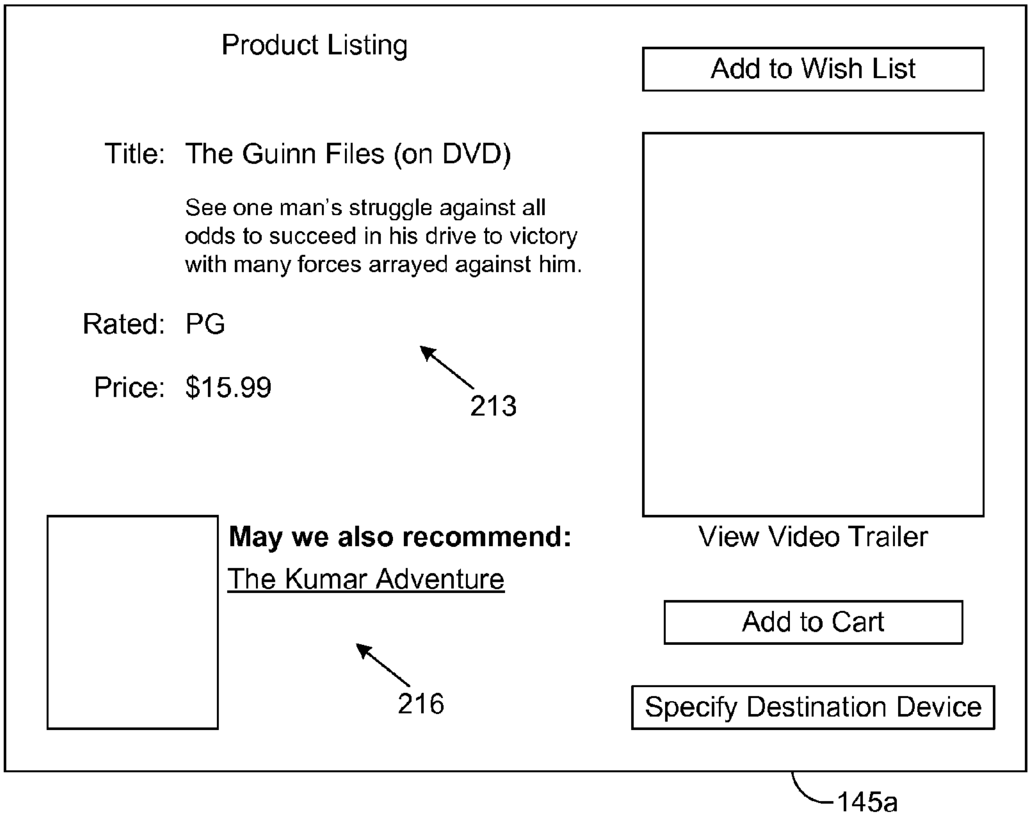
FIG. 4 is a drawing of a user interface rendered, for example, on a client in the electronic commerce network of FIG. 1 in order to purchase an item of media to be downloaded to a media device according to various embodiments of the present disclosure.

With reference to FIG. 4, shown is one example of a user interface 145*a* that comprises a page or portion of a network site 145 that is served up, for example, by the web server 133 in the electronic commerce applications 136 and displayed on a display device of a client such as the computer system 106*b* (FIG. 1) or the ebook reader 106*d* (FIG. 1) according to various embodiments. Alternatively, the user interface 145*a* may be generated on the display device of a different media device 106 such as the audio/video player 106*a* (FIG. 1) or on the set top box 106*c* (FIG. 1) in conjunction with its operation of the television 119 (FIG. 1) as described above.

The user interface 145*a* displays a product listing 213 that sets forth the listing of a product to be purchased by a respective entity that accesses the network site 145 served up by the web server 133 in the electronic commerce applications 136 for the sale of goods as described above. In addition, the user interface 145*a* further displays a product recommendation 216 for a different product for the user based upon their selection of the product listing 213 and/or based upon the information included in their interaction history 159 and record of media use 163 associated with such entity.

Figure 5:
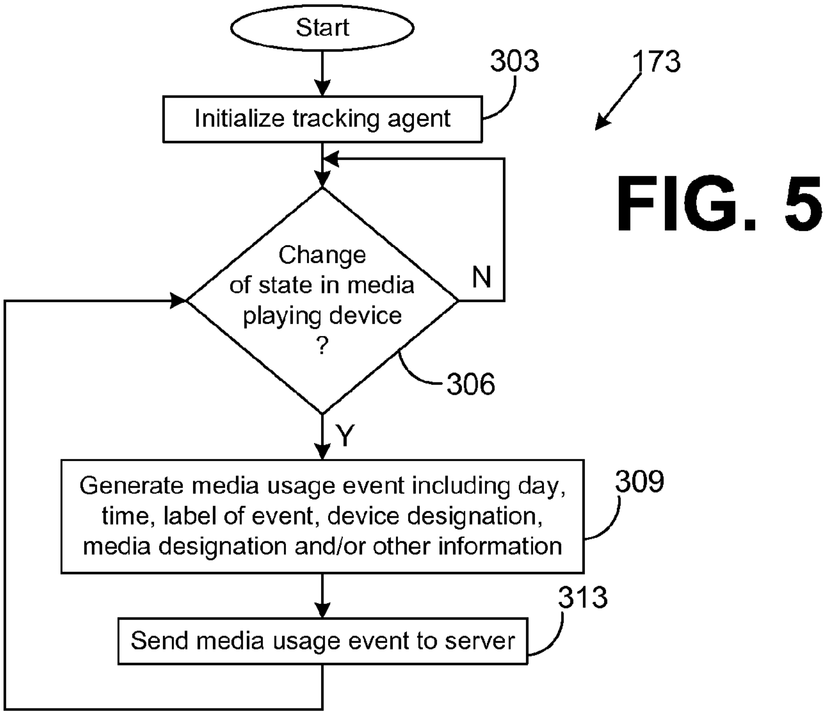
FIG. 5 is a flow chart that provides one example of the operation of a tracking agent executed on a media device in the electronic commerce network of FIG. 1 according to various embodiments of the present disclosure.

With reference next to FIG. 5, shown is one example of a flowchart that represents functionality of the tracking agent 173 according to various embodiments. Alternatively, the flow chart of FIG. 5 may be viewed as depicting steps of an example of a method implemented in a media device 106 (FIG. 1) to track usage of media. The tracking agent 173 may be implemented using any one of a number of programming languages such as, for example, C, C++, JAVA, or other programming languages.

Beginning with box 303, the tracking agent 173 is initialized such that it is instantiated, for example, and placed in a random access memory for operation. Also, any necessary variables may be initialized and the current state of the host media device 106 ascertained. Thereafter, in box 306, the tracking agent 173 proceeds to observe the operation of the media device 106 to detect a change in the state of such device that necessitates the creation of a media usage event 176 (FIG. 1) to be transmitted to the server 103 (FIG. 1). If no media usage event 176 occurs, then the tracking agent 173 remains at box 306.

Assuming that a change in the state of the operation of the media device 106 occurs in box 306, then the tracking agent 173 proceeds to box 309 in which a media usage event 176 is generated including such information as the day, time, label of the event that occurred, the device designation of the respective media device 106, the designation of the media associated with the event, and any other pertinent information. Thereafter, in box 313, the media usage event 176 is transmitted to the server 103 as described above. The tracking agent 173 then reverts back to box 306 in which the next change in the state of the media device 106 is detected as described above.

Figure 6:
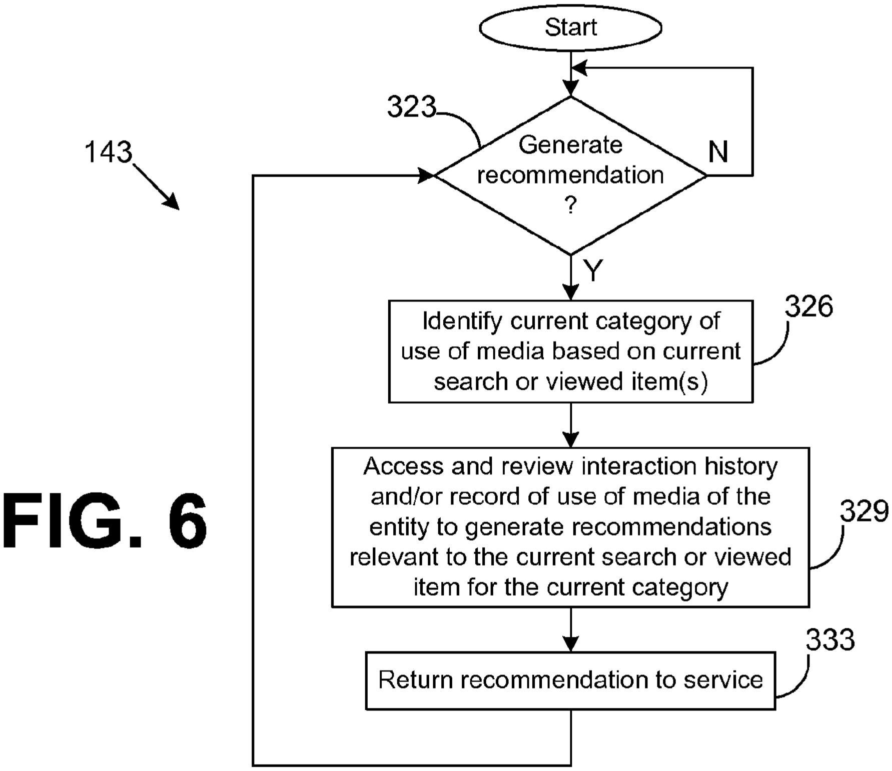
FIG. 6 is a flow chart that provides one example of the operation of a recommendations engine implemented as a portion of an electronic commerce application in a server in the electronic commerce network of FIG. 1 according to various embodiments of the present disclosure.

Next, reference is made to FIG. 6 that depicts one example of the operation of the recommendations engine 143 according to various embodiments. Alternatively, the flow chart of FIG. 6 may be viewed as depicting steps of an example of a method implemented in the server 103 (FIG. 1) to generate product purchase recommendations. The recommendations engine 143 may be implemented using any one of a number of programming languages such as, for example, C, C++, JAVA, or other programming languages.

Beginning with box 323, the recommendations engine 143 determines whether a recommendation is to be created. This may be determined if the recommendations engine 143 is called upon to do so by another service or application component that is part of the electronic commerce applications 136. Assuming that a recommendation is to be generated, then in box 326, the recommendations engine 143 identifies a current category of use of media that is applicable to the current interaction with the network site 145 (i.e. such as searching or viewing items) served up by the web server 133 (FIG. 1) and the electronic commerce applications 136 (FIG. 1). Alternatively, where the current interaction with the network site 145 is not taken into account in generating a product purchase recommendation, box 326 may be skipped.

In box 329, the recommendations engine 143 accesses and reviews the interaction history 159 and/or the record of media use 163 of the given entity to generate appropriate product purchase recommendations relevant to the current search or viewed item for the current category of use. Alternatively, the product purchase recommendations may not take the current interaction with the network site 145 into account.

In this respect, the generation of recommendations may be accomplished using any one of several approaches. For example, the interaction history 159 (FIG. 1) and the record of media use 163 (FIG. 1) may be reviewed in order to generate keywords associated with the media content reviewed. Also, appropriate weight or effect given to such keywords may be determined as well. For example, if a given media item 149 (FIG. 1)*had* been viewed multiple times as described above, then a relatively high weight may be associated with keywords or other information obtained therefrom.

Alternatively, if only a portion of a media item 149 has been viewed, thereby potentially indicating that the entity does not care for the given media item 149, then little or no weight may be afforded to such keywords or other information gleaned from the record of media use 163 or corresponding transactions in the interaction history 159.

In an alternative, the information contained in the record of media use 163 may be used as a filter to confirm or negate the importance of information indicated in the interaction history 159. For example, assume in this scenario that a given entity purchases a media item 149 to be viewed on a television 119 (FIG. 1) by virtue of a set top box 106*c* (FIG. 1). Further assume that the record of media use 163 reported by the tracking agent 173 in the set top box 106*c* indicates that only a portion of this media item 149 was viewed and that it was never viewed again. This would indicate that ultimately the entity is not happy with the purchase of the media item 149. Accordingly, to the extent that the interaction history 159 includes the purchase of such an item and would indicate interest on the part of the entity of such item, the information in the record of media use 163 negates the importance of such transaction by virtue of the fact that the full media item 149 was never viewed.

In a further scenario, the recommendations engine 143 may be configured to assign a weight to different types of keywords and other information gleaned from the interaction history 159 and the record of media use 163 based upon the usage of the media reported in the record of media use 163. In this respect, a greater weight might be assigned to keywords or other information gleaned from media items 149 that have been repeatedly viewed or used, whereas lesser weight may be assigned to media items 149 that have experienced lesser use on the part of a given entity.

Ultimately, the recommendations engine 143 generates a recommendation for the purchase of products for a given entity based upon the keywords or other information gleaned from the media items 149 (and/or metadata about the media items) and other information indicated in the interaction history 159 and the record of media use 163. As set forth above, the relative weight of such information based upon the record of media use 163 may be taken into account in generating the recommendations. Ultimately, in box 333, the recommendations engine 143 returns a recommendation of a product to be offered to a user in conjunction with a currently viewed portion of the network site 145 to the requesting service. Thereafter, the recommendations engine 143 proceeds to box 323 as shown.

Figure 7:
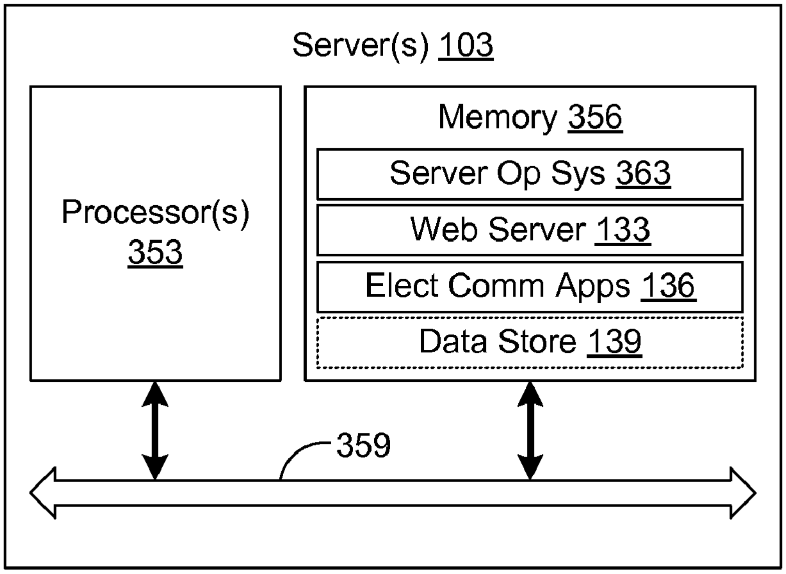
FIG. 7 is a schematic block diagram of one example of a server employed in the electronic commerce network of FIG. 1 according to an embodiment of the present disclosure.

With reference to FIG. 7, shown is one example of a server 103 according to various embodiments. The server 103 includes a processor circuit having a processor 353 and a memory 356, both of which are coupled to a local interface 359. The local interface 359 may comprise, for example, a control/address bus as can be appreciated.

Stored in the memory 356 and executable by the processor 353 is a server operating system 363, the web server 133, and the electronic commercial applications 136. Also, the data store 139 may be stored in the memory or some other memory accessible by the server 103.

Figure 8:
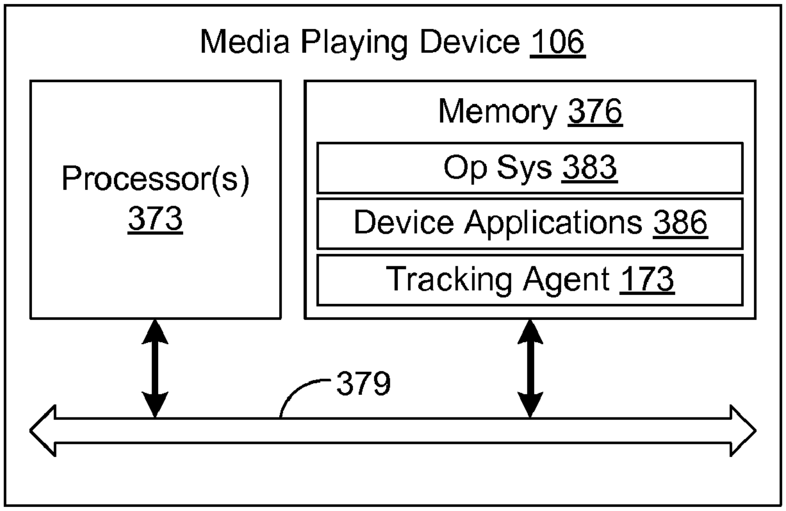
FIG. 8 is a schematic block diagram of one example of a media device employed in the electronic commerce network of FIG. 1 according to an embodiment of the present disclosure.

Next, with reference to FIG. 8, shown is one example of a media device 106 according to various embodiments. The media device 106 includes a processor circuit having processor 373 and a memory 376, both of which are coupled to a local interface 379. To this end, the processor circuit is similar to that which might be included in a media player 106*a*, computer system 106*b*, set top box 106*c*, ebook reader 106*d*, or other device as can be appreciated. The local interface 379 may comprise, for example, a data/address bus as can be appreciated. Stored in the memory 376 and executable by the processor 373 is an operating system 383, device applications 386, and a tracking agent 173. The device applications 386 may comprise those applications necessary for the operation of the media device 106 itself.

With respect to both FIGS. 7 and 8, a number of software components are stored in the memories 356 or 376 and are executable by the respective processors 353 or 373. In this respect, the term "executable" means a program file that is in a form that can ultimately be run by the respective processors 353 or 373. Examples of executable programs may be, for example, a compiled program that can be translated into machine code in a format that can be loaded into a random access portion of the memories 356 or 376 and run by a respective processor 353 or 373, or source code that may be expressed in proper format such as object code that is capable of being loaded into a random access portion of the memories 356 or 376 and executed by a respective processor 353 or 373, etc. An executable program may be stored in any portion or component of the memories 356 or 376 including, for example, random access memory, read-only memory, a hard drive, compact disk (CD), floppy disk, or other memory components.

Each of the memories 356 or 376 is defined herein as both volatile and nonvolatile memory and data storage components. Volatile components are those that do not retain data values upon loss of power. Nonvolatile components are those that retain data upon a loss of power. Thus, each of the memories 356 or 376 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 353 or 373 may represent multiple processors and each of the memories 356 or 376 may represent multiple memories that operate in parallel processing circuits, respectively. In such a case, each of the local interfaces 359 or 379 may be an appropriate network that facilitates communication between any two of the multiple processors, between any processor and any of the memories, or between any two of the memories, etc. The processors 353 or 373 may be of electrical or of some other construction as can be appreciated by those with ordinary skill in the art.

The operating systems 363 and 383 are executed to control the allocation and usage of hardware resources such as the memory, processing time and peripheral devices in the server (s) 103 or media device 106. In this manner, the operating systems 363 and 383 serve as the foundation on which applications depend as is generally known by those with ordinary skill in the art.

Although the electronic commerce applications 136 and the tracking agent 173 may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow charts of FIGS. 5-6 show one example of the architecture, functionality, and operation of an implementation of the tracking agent 173 and the recommendations engine 143. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIG. 5 or 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various embodiments of the tracking agent 173 and the recommendations engine 143 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various embodiments of the tracking agent 173 and the recommendations engine 143 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising the steps of:

accessing first data using a server, the first data comprising an interaction history of an entity with respect to at least one network site;

accessing second data using the server, the second data comprising a record of use of media by the entity on at least one media device remote to the server;

identifying in the server at least one category of use of the media associated with the entity;

drawing an association between the at least one category of use and a current interaction with the network site by the entity; and generating a recommendation in the server for the purchase of items for the entity based on the first and second data.

2. The method of claim 1, further comprising the step of:

assigning a weight to the first data and to the second data; and where a relative importance of the first and second data in generating the recommendation is determined based upon the weight assigned to the first data and to the second data.

3. The method of claim 1, further comprising the steps of:

implementing an electronic commerce application in conjunction with the network site on the server; and selling the media to the entity through the network site.

4. The method of claim 1, further comprising the step of serving up the recommendation to a client associated with the entity.

5. The method of claim 1, further comprising the step of storing the second data received from at least one media device associated with the entity.

6. The method of claim 1, further comprising the step of storing a rating of the media received from the at least one media device associated with the entity.

7. The method of claim 1, wherein the step of generating the recommendation in the server for the purchase of items for the entity based on the first and second data further comprises generating the recommendation based upon the at least one category of use associated with the entity.

8. The method of claim 1, wherein the step of identifying in the server the at least one category of use of the media associated with the entity further comprises the step of identifying at least one circumstance surrounding the use of the media.

9. The method of claim 8, wherein the at least one circumstance further comprises a time of day of the use of the media.

10. The method of claim 8, wherein the at least one circumstance further comprises a location of the use of the media.

11. The method of claim 8, wherein the at least one circumstance further comprises a state of at least one control component associated with the media device employed for the use of the media.

12. A method, comprising the steps of:

accessing, using a server, an interaction history of an entity with respect to at least one network site comprising a past and current interaction;

accessing, using the server, a media usage event generated by at least one media device remote to the server, the media usage event comprising an indication of a change in state of the at least one media device; and generating a recommendation in the server for the purchase of items for the entity based on at least the interaction history and the media usage event.

13. The method of claim 12, wherein the step of generating a recommendation further comprises the step of assigning a weight to a portion of the interactive history.

14. The method of claim 12, wherein the change in state is selected from a group consisting of a start of playing, a stop of playing, a volume adjustment, a fast forwarding, a rewinding, a skipping a portion of content, and a recording of a portion of content.

15. The method of claim 12, wherein the entity comprises a plurality of users, the method further comprising the step of determining an identify of one of the plurality of users.

16. The method of claim 15, wherein the step of determining an identify comprises the step of determining based on at least the interaction history and the media usage event.

17. The method of claim 12, further comprising the step of determining a category of use of media based on at least the media usage event.

18. The method of claim 12, further comprising the step of identifying at least one circumstance surrounding a use of media based on at least the media usage event, wherein the at least one circumstance is selected from a group consisting of a time of day of the use of media and a location of the use of media.

* * * * *